United States Patent [19]

Inoue

[11] Patent Number: 4,642,444

[45] Date of Patent: * Feb. 10, 1987

[54] ELECTRICAL MACHINING FLUID AND METHOD UTILIZING THE SAME

[75] Inventor: Kiyoshi Inoue, Tokyo, Japan

[73] Assignee: Inoue-Japax Research Incorporated, Kanagawaken, Japan

[ * ] Notice: The portion of the term of this patent subsequent to Sep. 3, 2002 has been disclaimed.

[21] Appl. No.: 438,285

[22] Filed: Nov. 1, 1982

[30] Foreign Application Priority Data

Nov. 2, 1981 [JP] Japan ................................. 56-176128

[51] Int. Cl.$^4$ .......................... B23H 1/08; H01B 3/22; H01B 3/46
[52] U.S. Cl. ................................ 219/69 D; 252/573; 556/445
[58] Field of Search ........................... 219/69 R, 69 D; 252/573; 556/445, 446

[56] References Cited

U.S. PATENT DOCUMENTS

| 2,427,588 | 9/1947 | Burnett | 219/69 E |
| 2,476,307 | 7/1949 | Klein | 556/446 |
| 2,486,281 | 10/1949 | Henry | 219/69 E |
| 2,526,423 | 10/1950 | Rudorff | 219/69 W |
| 2,559,342 | 7/1951 | Burkland | 556/446 |
| 2,846,458 | 8/1958 | Haluska | 556/445 |
| 2,962,577 | 11/1960 | Webb | 219/69 D |
| 3,169,942 | 2/1965 | Pike | 556/445 |
| 3,183,254 | 5/1965 | Rossmy | 252/573 |
| 3,346,713 | 10/1967 | Blatt et al. | 219/69 D |
| 3,420,759 | 1/1969 | Inoue | 219/69 D |
| 3,558,843 | 1/1971 | O'Connor | 219/69 E |
| 3,600,546 | 8/1971 | Niwa | 219/69 D |
| 3,626,137 | 12/1971 | Bertalasi | 219/69 D |
| 3,711,676 | 1/1973 | Witzel | 219/69 D |
| 3,851,135 | 11/1974 | Moracz et al. | 219/69 D |
| 4,005,304 | 1/1977 | Stayner | 219/69 D |
| 4,287,403 | 9/1981 | Sato et al. | 219/69 G |

FOREIGN PATENT DOCUMENTS

| 52-56492 | 5/1977 | Japan | 219/69 D |
| 56-45331 | 4/1981 | Japan | 219/69 D |
| 2074073A | 10/1981 | United Kingdom | 219/69 D |
| 598726 | 2/1978 | U.S.S.R. | 219/69 D |
| 682347 | 8/1979 | U.S.S.R. | 219/69 D |

OTHER PUBLICATIONS

"Choice of EDM Tooling", by Carter et al., *EDM Digest*, Jan./Feb. 1981, pp. 27–33, vol. 111, No. 1.

*Primary Examiner*—A. D. Pellinen
*Assistant Examiner*—Geoffrey S. Evans
*Attorney, Agent, or Firm*—Karl F. Ross; Herbert Dubno

[57] ABSTRACT

A novel, nonflammable, high-performance and economical machining fluid of the invention contains an organic or semi-organic substance other than hydrocarbons at a proportion of 0.1 to 5% by weight and the balance essentially water. The machining fluid may optionally contain further at least one hydrocarbon oil such as kerosene and transformer oil. The substance should contain at least one element which upon discharge decomposition of the machining fluid in the gap produces an oxide of the element for example, silicon oxide or titanium oxide. As preferred but exemplary, the substance may be water-soluble silicone oil which should preferably be a polyether denatured silicone oil. The machining fluid is preferably used in a machining method of the open-to-air-gap mode.

22 Claims, No Drawings

ELECTRICAL MACHINING FLUID AND METHOD UTILIZING THE SAME

FIELD OF THE INVENTION

The present invention relates to a novel machining fluid for electrical machining and a novel machining method using the same. The term "electrical machining" is used herein to refer generally to a process of machining a workpiece by electrical energy in which a tool electrode is spacedly juxtaposed with the workpiece across a machining gap in the presence of a machining fluid and the gap is traversed by an electric current, typically in the form of a succesion of electrical pulses, to electroerosively remove material from the workpiece. Such machining processes are known to include EDM (electrical discharge machining), ECM (electrochemical machining) and ECDM (electrochemical-discharge machining). The invention particularly relates to electrical machining of the type in which metal removal from the workpiece is derived at least in part by the action of electrical discharges and thus primarily to EDM and ECDM. As electroerosive material removal proceeds, the tool electrode and the workpiece are relatively displaced to advance machining in the workpiece while maintaining the size of the machining gap substantially constant.

BACKGROUND OF THE INVENTION

In the field of electrical machining the machining fluid has been recognized to be extremely important. In EDM, for example, two sorts of the machining fluid have been currently in use. Thus, in the ram-type EDM used for drilling or cavity-sinking, a hydrocarbon liquid (oil) such as kerosene or transformer oil has been commonly used. In the wire-cut or traveling-wire EDM, it has been common to use a water fluid and, especially, distilled water.

Kerosene has advantageously been used in the ram-type EDM not only for its non-corrosiveness but for its superiority in removal rate capability over water in general and its uniform utility over the extensive ranges of machining setting conditions, viz. from a finish range which enables a finer surface finish to be achieved at the expense of removal rate to a roughing range which enables a higher removal rate to be achieved at the expense of surface finish. Furthermore, kerosene is available at a relatively reasonable price and has a relatively long service life. In addition, it can be processed relatively readily for disposal and gives rise to no particular pollution problem when treated properly, although kerosene, like other hydrocarbon liquids, tends to roughen the operator's skin.

Kerosene and other hydrocarbons such as transformer oil are, however, fatally disadvantageous in that they are inflammable. In the course of a machining operation, when the surface of the hydrocarbon machining liquid in which the tool electrode and the workpiece are spacedly juxtaposed to define a machining gap happens to drop so that the separation of the gap from air (oxygen) is broken, the hydrocarbon liquid in the gap is ignited by electrical discharges, thus causing a fire. Thus, extreme care must be exercised by the operator throughout the machining operation vis a vis the inflammability of the machining liquid and a fire extinguisher must be provided. It must also be noted that kerosene for this reason cannot be used in the traveling-wire EDM in which the machining gap is defined in the air.

On the other hand, water is advantageous in that it is entirely free from the danger of fire, is available at a very reasonable cost, presents no hazard to the operator's skin and is readily processable for disposal or recycling. Water is, however, fatally disadvantageous in that it is inferior in removal rate capabilities, especially in medium and roughing ranges. When the existing water liquid is used in these ranges, machining becomes difficult or cannot be performed at a reasonable removal rate. In addition, water can in general not be used in a "no wear" or "low wear" machining mode. For these reasons, it is the state of the art that water has found its use almost exclusively in the traveling-wire EDM, in spite of its definite disadvantages mentioned above.

In discussing the conventional use of electrical machining fluids, it should also be mentioned that the use of an aqueous solution has been generally known. Thus, in ECM and ECDM, it is commonly required to use an aqueous solution of an electrolyte since these processes commonly entail at least in part the electrolytic dissolution of material from the workpiece. In the field of EDM, there has been a proposal to use an aqueous solution of a certain organic substance. For example, U.S. Pat. No. 3,168,638 to M. J. RIDDLES and U.S. Pat. No. 3,334,210 disclose aqueous solutions containing polyethylene glycol which are claimed to allow an increased "metal removal efficiency" to be achieved. Further, a conventional rust inhibitor may be added to each of these machining fluids. Unfortunately, however, these proposed EDM fluids have not been put into practical use. First of all, these fluids are relatively costly and not available at a reasonable price. Secondly, the machining results, all in terms of removal rate, relative electrode wear and surface finish, obtainable with these fluids are still much inferior to those achieved with a hydrocarbon such as kerosene. Evidently, this is due to the fact that discharge efficiency is still much deficient compared with that achieved with the hydrocarbon liquid. The inventor has recognized that the discharge decomposition products from these fluids in the machining gap are, in major part, a hydroxide and carbonyl base which tend to substantially reduce the resistance of the machining gap so that the discharge efficiency for the machining process remains unsatisfactory.

OBJECTS OF THE INVENTION

The present invention seeks to provide a novel and useful water-based machining fluid which retains the advantages of water and yet affords the discharge efficiency which is much greater than with water and which approaches or is even superior to, that attainable with a hydrocarbon fluid. The present invention also seeks to provide a novel and useful electrical machining method which affords machining performance which has never been attained heretofore.

SUMMARY OF THE INVENTION

In accordance with the present invention there is provided, in a first aspect thereof, an electrical machining fluid which consists of 0.1 to 5% by weight an organic or semi-organic substance and the balance essentially water, the organic substance containing an element which upon decomposition of the fluid by an electrical discharge is capable of producing an oxide thereof. It has been found that the machining fluid when so composed suffers less drop in its resistance even after traversing the discharge gap, thus permitting electrical machining discharges to proceed with increased efficiency.

It has been found that the substance should desirably be a water-soluble substance of the type described but may be a solid or semi-solid substance of the type described.

In accordance with a specific exemplary aspect of the present invention, the organic substance described should have a component having a chemical bond which is expressed by one of the following chemical formulae:

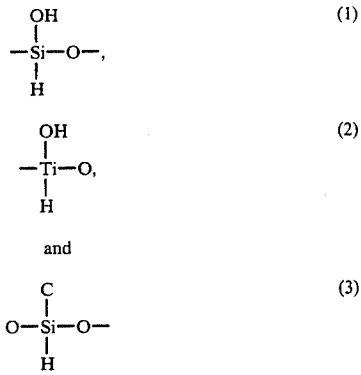

or a derivative of one of them. Thus, when the organic substance contains the component (1) or (3) or a derivative of each thereof, the machining fluid upon discharge decomposition produces silicon oxide ($SiO_2$). When the organic substance contains the component (2) or a derivative thereof, the machining fluid upon discharge decomposition produces titanium oxide ($TiO_2$). One specific exemplary or preferred such organic substance is a silicone oil.

Thus, in accordance with another aspect of the present invention, there is thus provided an electrical machining fluid which consists 0.1 to 5% by weight of a water-soluble silicone oil and the balance essentially water. Specifically, the silicone oil should preferably be one which is or is usable as, a non-ionic surface active agent, or a denaturated silicone oil. The latter is preferably a polyether denaturated silicone oil.

In accordance with still another aspect of the present invention, there is provided an electrical machining fluid which consists 0.1 to 5% by weight of a water-soluble silicone oil which may be of the type described, 0.1 to 5% by weight a hydrocarbon liquid and the balance essentially water. The hydrocarbon is preferably kerosene or any other hydrocarbon which has a flash point not less than that of kerosene.

The present invention provides, in a further aspect thereof, a method of electrically machining a conductive workpiece, which method comprises spacedly juxtaposing a tool electrode with the workpiece to define a machining gap therebetween in atmospheric air; passing a machining fluid into and through the machining gap and permitting the machining fluid to pass out of the gap directly into the atmospheric air without immersing the workpiece in the machining fluid; applying a succession of electrical machining pulses across the tool electrode and the workpiece to effect a succession of electrical discharges through the machining gap in the presence of the machining fluid, thereby electroerosively removing material from the workpiece at least in part by the electrical discharges, the machining fluid consisting 0.1 to 5% by weight of an organic or semi-organic substance other than hydrocarbon oils, 0 to 5% by weight of at least one hydrocarbon oil and the balance essentially water, the organic substance containing an element which upon decomposition of the fluid by the electrical discharges is capable of producing an oxide thereof; and relatively displacing the tool electrode and the workpiece while maintaining the machining gap substantially constant to advance the material removal in the workpiece.

Since the machining fluid is basically water-based and consists in its substantial or major portion of water according to the invention, there is practically no danger of fire even though the machining gap is defined in the atmospheric air. Furthermore, the placement of the machining gap in the atmospheric air has been found to be advantageous to further enhance the discharge efficiency. When the machining gap is defined in the atmospheric air without immersing the workpiece in the machining fluid, there is no overcooling of the machining site as encountered when the workpiece is immersed in the water. Thus, the tool electrode and the workpiece are held effectively at a relatively high temperature of 70° to 80° C. This allows practically each of applied electrical pulses to result in a corresponding electrical discharge without fail, thus increasing the discharge efficiency.

In the method described, the tool electrode should preferably be composed of graphite, or a sintered graphite-metal composite material.

The organic or semi-organic substance may here again be a silicone oil having a siloxene bond (—Si—O—Si—O). The silicone oil is preferably a polyether denaturated silicone oil but any other denaturated silicone oil such as olefin denaturated silicone oil, amino denaturated silicone oil or alcohol denaturated silicone oil may be used. Other than a silicone oil a sorbitan material such as sorbitanmonolaurate or polyoxyethylsorbitanmonolaurate may also be used.

For EDM or ECDM processes, the machining fluid according to a preferred feature the present invention should further incorporate in a desired proportion an electrolyte such as sodium chloride, sodium nitrate, sodium nitrite, potassium nitrate, potassium nitrite, sodium carbonate or sodium hydroxide conventionally used in the processes.

A water-soluble silicone oil used to embody the present invention such as polyether denaturated silicone oil has a surface tension of 25 to 30 dyne/cm, when contained at a weight proportion of 1% in water and 21 to 31 dyne/cm when contained at a weight proportion of 5% in water. Its specific gravity is 1.00 to 1.10 (at 25° C.) and its refractive index is 1.420 to 1.460 (at 25° C.). It has a viscosity of 100 to several tens thousands CS (at 25° C.). When contained at a proportion of 10% by weight in water, it has a cloud point of 100° C. When contained at a proportion less than 10% by weight in water, it has a cloud point less than 100° C. The silicone oil should preferably be one having a viscosity (dynamic) in the order of 100 CS or 1000 CS and a cloud point around 100° C. or less.

SPECIFIC DESCRIPTION

The present invention will hereinafter be described with reference to specific examples which are given herein as preferred but only exemplary.

EXAMPLE I

Using each of various machining fluids used in the prior art and those according to the present invention, a workpiece composed of a S55C steel (Japanese Industrial Standard) was EDM-machined with a cylindrical tool electrode having a diameter of 30 mm and composed of copper. The prior-art fluids were: A: distilled water having a specific resistance of $0.5 \times 10^4$ ohm-cm; B: water containing polyethylene glycol in an amount of 80% by weight; and C: kerosene. The fluids according to the invention were liquids D, E, F and G resulting from adding to or dissolving into the water of A a silicone oil in proportions of 0.2%, 0.5%, 1.0% and 20% by weight, respectively, the silicone oil being a polyether denaturated silicone oil sold by Shin-etsu Kagaku Kogyo, Co., Ltd., Japan, under its product identification KF-352 and having a viscosity of 1600 CS (at 25° C.), a specific gravity of 1.03 (at 25° C.) and a refractive index of 1.446 (at 25° C.). EDM machining pulses have a pulse duration ($\tau$on) of 60 μsec, a pulse interval ($\tau$off) of 20 μsec and a peak current (Ip) of 45 amperes. The tool electrode was poled positive and the workpiece was poled negative. These tests have the results shown in the following table:

TABLE 1

| Machining Fluid | A | B | C | D | E | F | G |
|---|---|---|---|---|---|---|---|
| Removal Rate (gr/min) | 0.5 | 0.85 | 1.15 | 0.8 (0.9) | 0.95 (1.1) | 1.1 (1.25) | 1.2 (1.4) |
| Relative Electrode Wear (E/W (%)) | 88 | 60 | 12 | 35 (35) | 28 (30) | 20 (22) | 14 (15) |
| Surface Roughness (μRmax) | 65 | 60 | 50 | 60 (60) | 60 (55) | 55 (50) | 55 (50) |

Numerals bracketed for D, E, F and G in Table 1 above represent respective values obtained when machining is carried out in the particular mode, which constitutes a further feature of the invention, in which the tool electrode and the workpiece is spacedly juxtaposed across a machining gap in a worktank not filled with the machining fluid and the machining fluid is supplied into the machining gap through the tool electrode, the workpiece and/or one or more nozzles and the machining fluid from the gap is drained out of the worktank without filling it therewith or having the gap immersed therein. Such a mode is advantageously permitted to conduct due to the fact that the machining fluid according to the present invention is essentially non-inflammable. Numerals not bracketed in Table 1 above represent respective values obtained in the ordinary EDM mode in which the machining gap is fully immersed in the machining fluid.

From Table 1 above, it will be seen that machining fluids D-G according to the invention afford the results which are essentially better than those with machining fluids A and B which are also water-based. Machining fluids D-G according to the invention substantially retain the advantages of water and yet afford removal rates which are comparable with or even higher than that attainable with kerosene or machining fluid C. Surface roughnesses achieved with the fluids D-G are also excellent and approach that attainable with machining fluid C. Yet, surprisingly, the machining fluids according to the invention and especially G afford a relative electrode wear which is much lower than that attainable with pure water (A) or the conventional water-based fluid (B) and even approach that attainable with kerosene (C). In addition, it should be noted that the machining fluid D-G are essentially rust-inhibiting like B or C.

EXAMPLE II

Several runs of EDM were carried out using various machining fluids. In each run, a copper electrode having a diameter of 30 mm was used for machining a workpiece composed of SK6 (Japanese Industrial Standard) steel. Machining pulses used had a pulse duration ($\tau$on) of 120 μsec, a pulse interval ($\tau$off) of 40 μsec and a peak current (Ip) of 13 amperes. The machining fluids used are as follows: H: distilled water identical to A in EXAMPLE I; I: a conventional hydrocarbon liquid similar to C in EXAMPLE II; and J, K, L and M according to the present invention. The fluid J contained 2% by weight of the silicone oil identified in EXAMPLE I. The fluids K, L and M were obtained by adding to the fluid H another silicone oil, viz one sold by Toshiba Silicone Oil Co., Ltd., Japan, under its product identification YE 3842, and further a transformer oil in varying proportions. The silicone oil was a polyoxylalkylene denaturated silicone and had a viscosity of 170 CS, a specific gravity of 1.07, a refractive index of 1.454 and a surface tension of 23.7 dyne/cm each at 25° C., and a cloud point of 44° C. with a 5% aqueous solution. The fluid K contained 2% by weight of the silicone oil and 0.5% by weight of the transformer oil, the fluid L contained 1% by weight of the silicone oil and 1% by weight of the transformer oil and the fluid M contained 1% by weight of the silicone oil and 2% by weight of the transformer oil. The result of the EDM runs are summarized in the table below.

TABLE 2

| Machining Fluid | H | I | J | K | L | M |
|---|---|---|---|---|---|---|
| Removal Rate (gr/min) | 0.03 | 0.08 | 0.09 (0.12) | 0.09 (0.12) | 0.1 (0.12) | 0.9 (0.12) |
| Relative Electrode Wear (E/W (%)) | 80 | 1 | 32 (33) | 12 (11) | 6 (5) | 4 (4) |
| Surface Roughness (μRmax) | 35 | 30 | 30 (28) | 28 (25) | 28 (26) | 27 (25) |

In Table 2 above, here again, numerals not bracketed represent results of machining in the immersion mode and numerals bracketed represent results of machining in the open to air mode.

What is claimed is:

1. An electrical machining fluid consisting of 0.1 to 5% by weight at least one hydrocarbon oil, 0.1 to 5% by weight a silicone oil and the balance substantially water.

2. The machining fluid defined in claim 1 wherein said silicone oil is a polyether denaturated silicone oil.

3. An electrical machining fluid for use in combination with a tool electrode for removing material from a conductive workpiece by means of a succession of electrical discharges effected through the machining fluid between the tool electrode poled positive and the workpiece poled negative, the machining fluid consisting of 0.1 to 5% by weight at least one hydrocarbon oil, 0.1 to 5% by weight a non-ionic surfactant and the balance substantially being water, said workpiece being composed of a steel while said electrode is composed of a material selected from the group which consists of copper, graphite and a copper-carbon composite material.

4. The machining fluid defined in claim 3 wherein said surfactant is a silicone oil.

5. The machining fluid defined in claim 4 wherein said silicone oil is a polyether denatured silicone oil.

6. The machining fluid defined in claim 1 or 3 wherein said at least one hydrocarbon oil includes kerosene.

7. The machining fluid defined in claim 1 or claim 3 wherein said at least one hydrocarbon oil includes at least one hydrocarbon oil other than kerosene and having a flash point not lower than that of kerosene.

8. An electrical machining fluid for use in combination with a tool electrode for removing material from a conductive workpiece by means of a succession of electrical discharges effected through the machining fluid between the tool electrode poled positive and the workpiece poled negative, the machining fluid consisting of 0.1 to 5% by weight at least one hydrocarbon oil, 0.1 to 5% by weight a non-ionic surfactant and the balance substantially being water, said workpiece being composed of a steel while said electrode is composed of a material selected from the group which consists of copper, graphite and a copper-carbon composite material, said surfactant containing an element which upon decomposition of said fluid by the electrical discharges is capable of producing an oxide of said element, thereby limiting the decomposed fluid to form hydroxide and carbonyl bases which cause a material drop in the resistivity of the machining fluid undergoing the electrical discharges.

9. The machining fluid defined in claim 8 wherein said surfactant is a substance having a siloxene bond.

10. The machining fluid defined in claim 8 wherein said element is at least one element selected from the group which consists of silicon, titanium, tin and antimony.

11. The machining fluid defined in claim 10 wherein said has at least one chemical bond selected from the group which consists of:

$$-\underset{\underset{H}{|}}{\overset{\overset{OH}{|}}{Si}}-O-, \quad -\underset{\underset{H}{|}}{\overset{\overset{OH}{|}}{Ti}}-O \text{ and } -\underset{\underset{H}{|}}{\overset{\overset{C}{|}}{Si}}-O-$$

12. A method of electrically machining a conductive workpiece, comprising the steps of:
(a) spacedly juxtaposing a tool electrode with said workpiece to define a machining gap therebetween in atmospheric air;
(b) passing a machining fluid into and through said machining gap and permitting said machining fluid to pass out of said machining gap directly into said atmospheric air without immersing said workpiece in said machining fluid;
(c) applying a succession of electrical machining pulses across said tool electrode poled positive and said workpiece poled negative to effect a succession of electrical discharges through said machining gap in the presence of said machining fluid, thereby electroerosively removing material from said workpiece by said electrical discharges, said machining fluid consisting of 0.1 to 5% by weight at least one hydrocarbon oil, 0.1 to 5% by weight a non-ionic surfactant and the balance essentially water; and
(d) relatively displacing said tool electrode and said workpiece while maintaining said machining gap substantially constant to advance the material removal in said workpiece.

13. The method defined in claim 12 wherein said at least one hydrocarbon oil includes kerosene.

14. The method defined in claim 12 wherein said at least one hydrocarbon oil includes at least one hydrocarbon oil other than kerosene and having a flash point not less than that of kerosene.

15. The method defined in claim 12 wherein said substance has at least one chemical bond selected from the group which consists of:

$$-\underset{\underset{H}{|}}{\overset{\overset{OH}{|}}{Si}}-O-, \quad -\underset{\underset{H}{|}}{\overset{\overset{OH}{|}}{Ti}}-O \text{ and } -\underset{\underset{H}{|}}{\overset{\overset{C}{|}}{Si}}-O-$$

16. The method defined in claim 12 wherein said tool electrode is composed of at least one substance selected from the group which consists of carbon, a metal and a carbonmetal composite material.

17. The method defined in claim 12 wherein said machining fluid is devoid of any of hydrocarbons which includes kerosene and a transformer oil.

18. A method of electrically machining a conductive workpiece, comprising the steps of:
(a) spacedly juxtaposing a tool electrode with said workpiece to define a machining gap therebetween in atmospheric air;
(b) passing a machining fluid into and through said machining gap and permitting said machining fluid to pass out of said machining gap directly into said atmospheric air without immersing said workpiece in said machining fluid;
(c) applying a succession of electrical machining pulses across said tool electrode poled positive and said workpiece poled negative to effect a succession of electrical discharges through said machining gap in the presence of said machining fluid, thereby electroerosively removing material from said workpiece by said electrical discharges, said machining fluid consisting of 0.1 to 5% by weight at least one hydrocarbon oil, 0.1 to 5% by weight a non-ionic surfactant and the balance essentially water; and
(d) relatively displacing said tool electrode and said workpiece while maintaining said machining gap substantially constant to advance the material removal in said workpiece, said substance containing an element which upon decomposition of said fluid by electrical discharges is capable of producing an oxide of said substance.

19. The method defined in claim 12 or claim 17 or claim 18 wherein said substance is a water-soluble silicone oil.

20. The method defined in claim 12, claim 17 or claim 18 wherein said substance is a polyether denaturated silicone oil.

21. The method defined in claim 18 wherein said element is at least one element selected from the group which consists of silicon, titanium, tin and antimony.

22. The method defined in claim 18 wherein said substance is a substance having a siloxene bond.

* * * * *